Patented June 30, 1925.

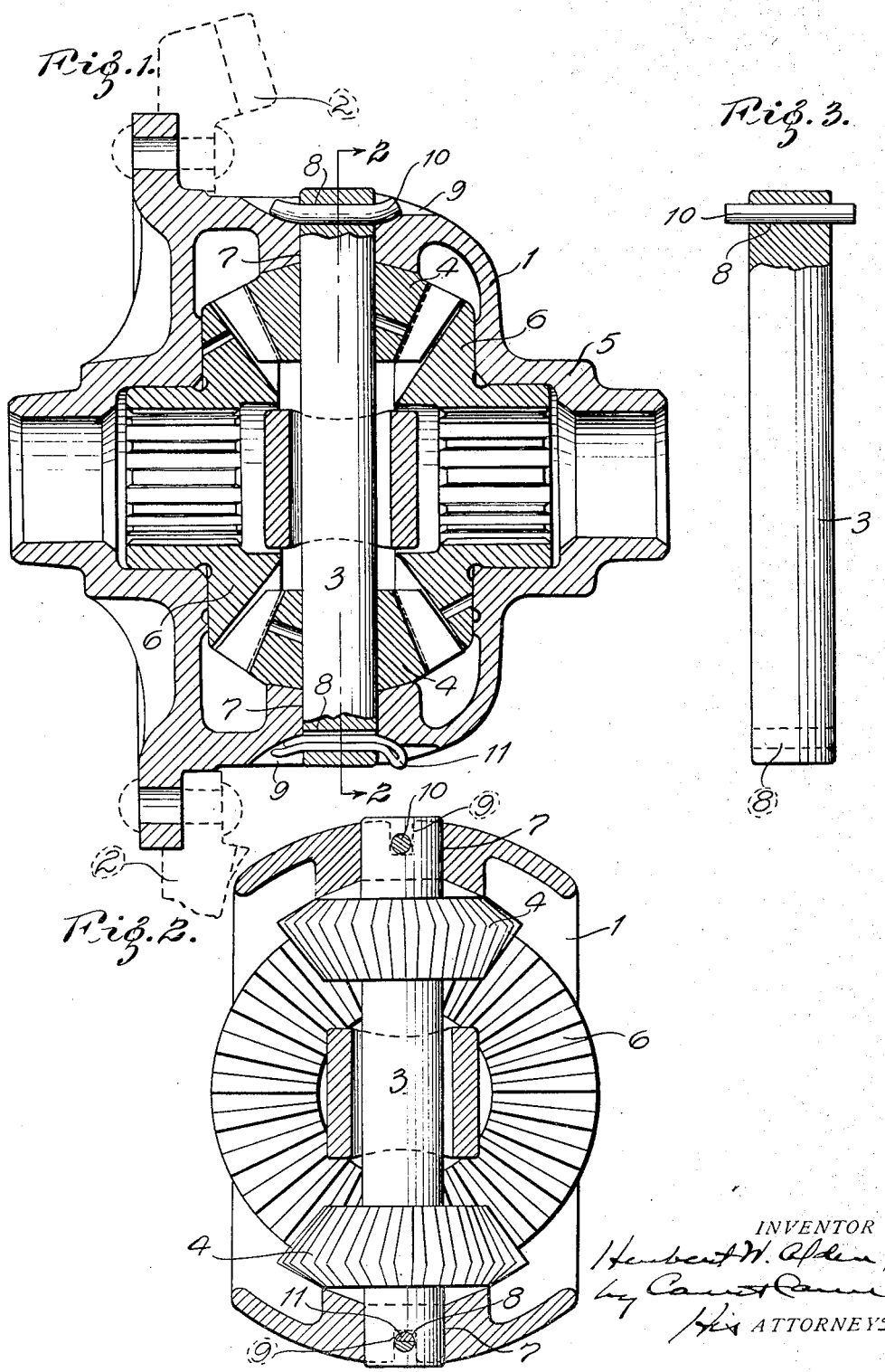

1,544,363

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF MICHIGAN.

DIFFERENTIAL MECHANISM AND METHOD OF ASSEMBLING SAME.

Application filed December 4, 1922. Serial No. 604,695.

*To all whom it may concern:*

Be it known that I, HERBERT W. ALDEN, a citizen of the United States, and a resident of the city of Detroit, in the county of Wayne and State of Michigan, have invented a new and useful Improvement in Differential Mechanism and Methods of Assembling Same, of which the following is a specification.

Heretofore there has been considerable difficulty in mounting and locking the pinion supporting members of differential mechanism in such manner as to obtain and maintain the necessary accuracy of position and fit. The purpose of my invention is to minimize such difficulty and to insure the accurate mounting and locking of the pinion support. The invention consists in the method and in the device hereinafter described and claimed.

In the accompanying drawing, wherein like numerals refer to like parts wherever they occur:

Fig. 1 is a central longitudinal section of a differential mechanism embodying my invention with part of the differential pinion supporting member and the locking pins shown in elevation.

Fig. 2 is a vertical cross section of my differential mechanism on the plane indicated by the dotted line 2—2 in Fig. 1 but showing the gears and the supporting member in elevation; and Fig. 3 is a detail view, partly in section, of the differential gear support with a locking pin mounted therein preparatory to mounting it in the differential case.

My differential mechanism comprises a case 1 to which the main driving gear 2 is secured and in which is mounted a spider or supporting member 3 for the differential pinions 4. Said case is also provided with hub portions 5 that receive the driven gears 6 of the differential.

According to the present invention, the case 1 is provided with two holes 7 in diametrical alinement and disposed parallel with the main driving gear 2. These holes are accurately positioned and formed to receive the supporting member 3 for the differential pinions 4. This supporting member or "spider" is of cylindrical form accurately sized and finished to fit the holes 7 provided therefor in the differential case. Near its respective ends, this pinion supporting member or "spider" is provided with holes 8 that extend transversely therethrough and are accurately spaced apart the proper distance for the locking pins hereinafter mentioned. Concave or inclined slots 9 are formed in the outer surface of the case at diametrically opposite points, that is in the same plane with the axis of the pinion supporting member or spider. Preferably these slots are formed with a circular saw or cutting tool, rotating in the plane of the axis of the differential mechanism and merge at the deepest portions with the holes for the pinion supporting member or spider.

Through the hole in one end of the spider extends a locking pin 10, made preferably of annealed spring steel wire, the said hole and pin being accurately made so as to have a light press fit. The hole in the opposite end of said spider is intended to receive a locking pin, preferably a cotter pin 11.

It is intended not only that the locking pins shall lie in the saw slots so as to be locked by the side walls thereof against rotation, but that said pins shall be bent against the bottoms of said slots and be thereby effectually held in place while themselves tightening and locking the spider. Accordingly the holes in the spider are correlated with the slots in the case, the spacing of the holes being such that when the spider is forced endwise until the locking pin in one end thereof is bent flush with the bottom of one slot, the other hole will be opposite and in alinement with the other slot, with the outer surface of the hole the proper distance from the bottom of the slot to permit the cotter pin to be forced through said hole and bent against the bottom of the slot.

In assembling my differential mechanism, the driven gears thereof are set in place in the hubs of the case, one or both of the differential pinions are positioned in axial alinement with the holes for the spider, and then the spider, with one of the locking pins extending therethrough, is forced endwise through one of the holes in the case provided therefor and through the pinions into and through the second hole in the case. The spider is thus forced until the locking pin thereon contacts with and is bent against the bottom of the saw slot provided therefor, in which position the hole through the opposite end of the spider lies opposite the second saw slot in the casing and properly alined relative to said slot ready to receive the cotter pin. When the cotter pin is driven through said hole, its end rides outwardly on the curved or inclined bottom of slot, which bottom serves as an anvil for tightening and bending said cotter pin. Thus the spider is effectually tightened and locked against both longitudinal and lateral movement. The assembly is not only very accurate and secure but is very quickly and easily effected.

What I claim is:

1. In mechanism, a case having diametrically opposite radially extending holes therethrough and slots in its outer surface disposed diametrically with respect to said holes, and a pinion supporting element mounted in said holes and itself having transverse holes and locking pins extending through said last mentioned holes, the distance between the bottoms of said slots being such that one of said locking pins is bent flush with the bottom of one slot when the other hole is exposed opposite the other slot the proper distance to receive the other locking pin and cause the bottom of said last mentioned slot to serve as an anvil for bending such pin.

2. The method of assembling differential mechanism wherein a pinion supporting spider is mounted in holes provided therefor in a casing which consists in forming concave slots in the periphery of the casing and extending through the holes for the spider, providing said spider with suitably spaced transverse holes mounting a locking pin in one hole of the spider, forcing said spider through the openings therefor in said case until the locking pin therein is bent against the bottom of one recess and the hole in the opposite end is in alinement with the other recess with its outer surface spaced from the bottom of the slot the proper distance for a locking pin, and then forcing said locking pin through said last mentioned hole and thereby bending it against the bottom of said slot.

Signed at Detroit, Michigan, this 28th day of November, 1922.

HERBERT W. ALDEN.